July 22, 1941.  S. J. HARLEY ET AL  2,250,076
GAUGE
Filed Aug. 13, 1940  2 Sheets-Sheet 1
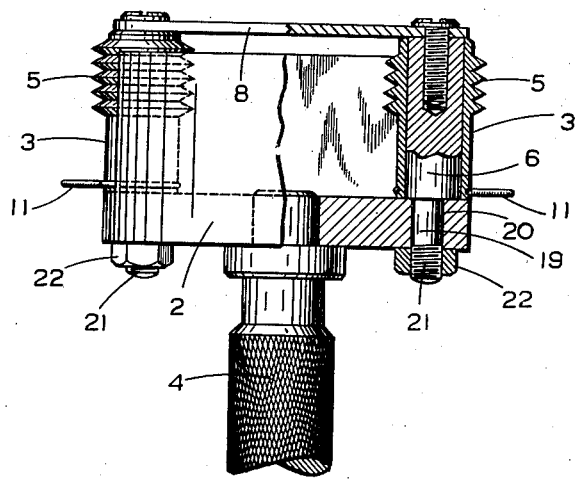
FIG. 1.
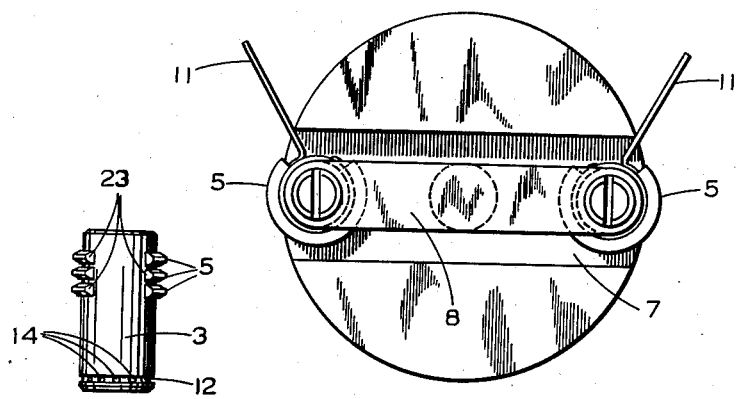
FIG. 4.  FIG. 2.
FIG. 5.
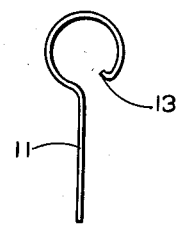
FIG. 6.
FIG. 3.
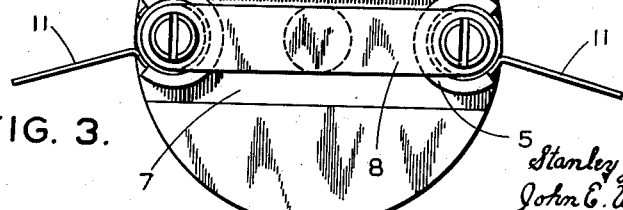
Inventors:
Stanley J. Harley
John E. Wainwright
by Babcock & Babcock
Attorneys July 22, 1941.  S. J. HARLEY ET AL  2,250,076
GAUGE
Filed Aug. 13, 1940  2 Sheets-Sheet 2

Inventors:
Stanley J. Harley
John E. Wainwright
by Babcock & Babcock
Attorneys

Patented July 22, 1941

2,250,076

UNITED STATES PATENT OFFICE 2,250,076

GAUGE

Stanley Jaffa Harley and John Ernest Wainwright, Coventry, England

Application August 13, 1940, Serial No. 352,462
In Great Britain December 16, 1939

3 Claims. (Cl. 33—199)

This invention relates to an improved gauge for checking internal screw threads.

According to the invention the improved gauge is characterized by a plurality of gauging elements mounted so as to be free for rotation about parallel axes and each formed with a series of circumferentially discontinuous external serrations for the purposes hereinafter described. Provision is made for rotating said rollers to bring their circumferential serrations into and out of the gauging position with respect to the internal screw thread.

The said rollers are rotatably mounted on pins projecting from one face of a head or gauge body parallel with each other and with the axis of the gauge, the arrangement being such that the radial distance between the axis of the gauge and the outer part of the serrated periphery of each roller is equal to half the nominal diameter of the gauge.

The invention includes the provision of means whereby the radial distance can be varied within manufacturing limits.

In the accompanying drawings:

Figure 1 is a view in elevation and partly in section of a gauge constructed and adapted for use according to this invention.

Figure 2 is a plan thereof with the gauging elements in their operative gauging positions.

Figure 3 is a view similar to Figure 2 showing the gauging elements in position to allow the gauge to be introduced into or withdrawn from engagement with an internally screw-threaded work-piece.

Figures 4 and 5 are elevation and plan views respectively of one of the gauging elements per se.

Figure 6 is a detail view of one of the feelers or handles for the gauging elements.

Figure 7:
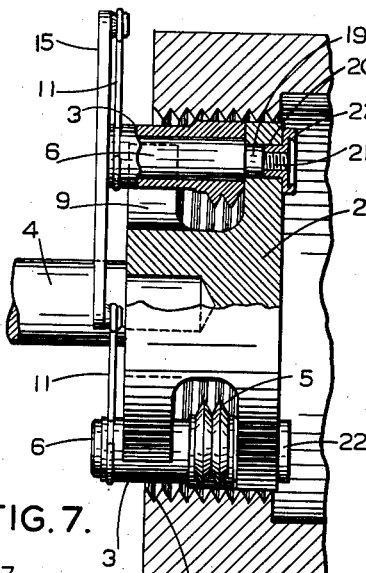
Figures 7 and 8 are vertical sectional and end views respectively of another form of the improved gauge with the gauging elements in position to allow for the introduction or withdrawal of the gauge into or from the work-piece.

Referring to the drawings, 2 represents the head or body of the gauge and 3 the gauging elements rotatably mounted thereon. The said body 2 is cylindrical and has a diameter which, in relation to the core diameter of the work-piece is such as to provide for centralization of the gauge with the work-piece. The said gauge body is provided with a central handle 4 secured to one face thereof.

The gauging elements 3 each consist of a roller having a series of circumferentially discontinuous thread form serrations 5. The said gauging elements are rotatably mounted on pins 6 secured to the said gauge body 2 with their axes parallel with each other and with the axis of the gauge and at such a radial distance from the gauge axis that the radial distance between the latter and the outer part of the serrated periphery of each gauging element is equal to half the nominal diameter of the gauge.

In the form shown in Figures 1, 2 and 3 the pins 6 project at right angles from the side of the gauge body 2 remote from the handle 4 and are accommodated in a deep recess 7 cut diametrically across the said body. If necessary, the pins can be supported by means of a tie 8 connecting their free ends.

In the alternative form shown in Figures 7, 8, 9 and 10 the pins 6 carrying the gauging elements 3 project from the same side of the gauge body 2 as the handle 4, the said body being formed with recesses 9 at opposite sides of its axis to receive said elements.

In order to enable the gauge to be introduced into and withdrawn from the work-piece the serrations 5 on the gauging elements are cut away at one or more places so that when rotated on their pins 6 to the position shown in Figure 3 with the cut-away portions 10 at the outside of the gauge, the serrations are clear of the internal screw thread in the work-piece. The gauging elements are then rotated into the position shown in Figure 2 to bring the serrations into engagement with the internal screw thread to be gauged. After the gauging operation has been completed the gauging elements are again rotated to the position shown in Figure 3 to disengage the serrations from the screw thread and enable the gauge to be withdrawn.

The gauging elements 3 can be rotated on their pins 6 by any suitable means either independently or simultaneously. For example, as shown in Figures 1, 2 and 3, each of said elements can be provided with a feeler or handle 11 consisting of a wire clip sprung around an annular groove 12 in the said elements and having a detent 13 adapted to engage any one of a series of holes 14 formed in said groove. By adjusting the angular positions of the feelers with respect to their associated gauging elements different portions of the serrated peripheries of the latter can be brought into effective use as other portions become worn.

Figure 8:
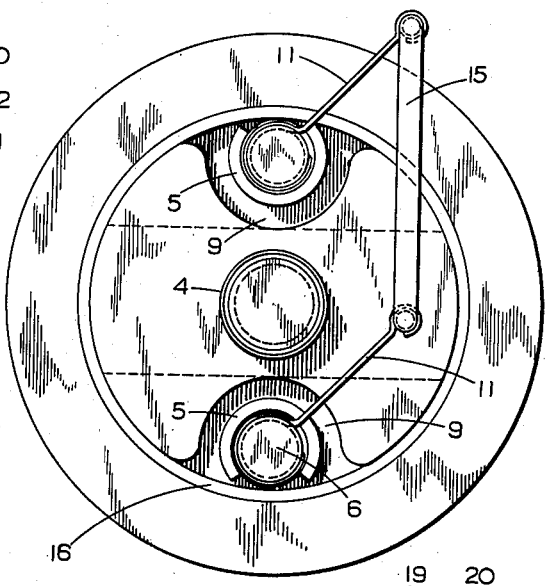

Simultaneous rotation of the gauging members can be obtained by connecting the handle portions of the feelers 11 by means of a rod 15, as shown in Figures 7 and 8. In the position shown in these figures the gauging elements 3 are in their inoperative positions for gauging purposes but by moving the rod 15 downwardly they can both be rotated simultaneously and to the same degree into their gauging positions in engagement with the screw-thread 16 to be gauged.

Figure 9:
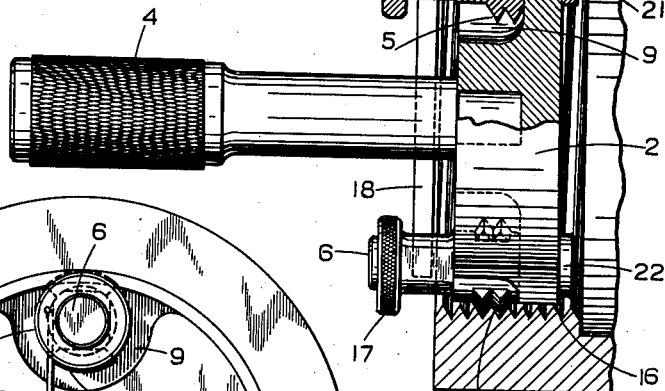
Figures 9 and 10 are views similar to Figures 7 and 8 illustrating the use of independently rotatable gauging elements and showing them in their operative gauging positions.
Figure 10:
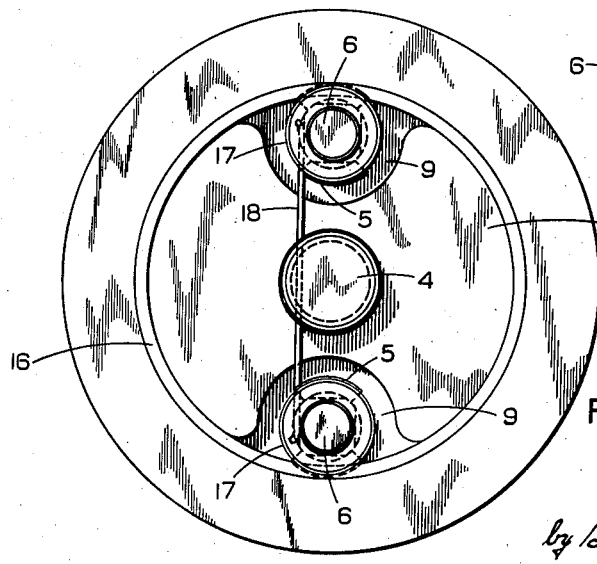

In Figures 9 and 10 the gauging elements 3 are shown as being formed or provided with knurled heads 17 whereby they can be independently rotated. A blade spring 18 fixed to the handle 4 and bearing at its ends against a non-serrated portion of each gauging element 3, may be employed to hold the latter in their angularly adjusted positions.

In the constructions shown in the accompanying drawings two gauging elements are used but it will be understood that the invention is not limited in this respect.

In order to provide for adjustment of the radial distance between the gauging elements 3 and the axis of the gauge, the pins 6 are preferably mounted eccentrically with respect to the rotational axes of the gauging elements, each pin having a reduced eccentric stem 19 passing through a plain hole 20 in the gauge body and provided with a screw thread 21 and clamping nut 22. By loosening the nuts each pin can be rotated to vary the radial distance between its axis and that of the gauge.

Figures 11, 12:
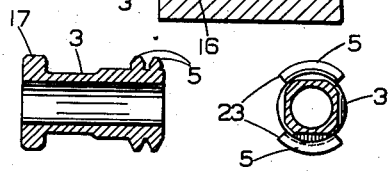
Figures 11, 12 and 13 show a modified form of gauging element per se in longitudinal section, cross-section and outside elevation respectively.
Figure 13:
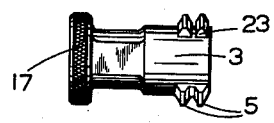

If, as shown in Figures 11, 12 and 13, the serrations 5 on the gauging elements 3 are cut away at two diametrically opposite places and the diameter of one portion of the serrations is made slightly larger than those of the opposite portion, the same gauge can be used as a limit gauge by rotating the said elements into "go" and "not go" positions. Alternatively, each end of the handle 4 may be provided with a gauge of the kind herein described, one serving as a 'go' and the other as a "not go" gauge.

The serrations on the rotatable gauging elements may either be of full thread form or of such form as to check individual dimensions of the thread, such as the effective diameter.

Apart from the primary function of enabling the gauge to be inserted in and withdrawn from the work-piece, the ends 23 of the serrations 5 at the cut-away portions of the gauging elements 3 as the latter are rotated into engagement with the screw thread, serve to remove any foreign matter which may have lodged in the threads and thereby assist in ensuring proper engagement between the serrations and the screw thread and a more accurate check on the form and dimensions of the latter.

We claim:

1. A gauge for gauging screw-threads in the wall of a bore of a work-piece, said gauge comprising a cylindrical head insertible into, and withdrawable from, such bore by a straight thrust axially of said head, in combination with a plurality of gauging elements mounted on said head adjacent the periphery thereof for rotation about axes parallel to the axis of said head, each said element having a series of external segmental serrations extending radially beyond the periphery of said head when the respective elements are moved about their respective axes to operative gauging position, said serrations lying in their entireties radially inward of the peripheral face of said head when said elements respectively are rotated about their respective axes to non-gauging position.

2. A gauge for gauging screw-threads in the wall of a bore of a work-piece, said gauge comprising a head insertible into, and withdrawable from, such bore by a straight thrust axially of said head, in combination with a plurality of gauging elements mounted on said head for movement about parallel axes, said elements respectively being formed with segmental serrations and with an unserrated segment extending axially of the respective elements between the ends of the corresponding serrations, said unserrated segments being of such degree that when the respective elements are moved about their respective axes to present their respective unserrated segments radially outwardly away from each other no portion of said serrations of any of said elements will extend radially outwardly beyond a circle struck from a point equidistant from the axes of all of said elements, and said segmental serrations projecting radially outwardly beyond the adjacent portions of said corresponding unserrated segments and extending radially beyond said circle when the respective elements are in such respective positions as to present their respective serrations radially outwardly away from each other.

3. A gauge for gauging serrations in the wall of a bore of a work-piece, said gauge comprising a head insertible into, and withdrawable from, such bore by a straight thrust axially of said head, in combination with a gauging element mounted for movement about an axis parallel to the axis of said head, said element being formed with a plurality of serrations and with an axially extending segmental portion, said axially extending segmental portion being of such degree of segment and of such form that when said element is moved about its axis to present said segment radially outwardly of said head no portion of said serrations or part of said segment will extend radially outwardly beyond a circle struck from the axis of said head, and said serrations projecting radially outwardly beyond the adjacent portions of said segment and extending radially beyond said circle when said element is in such position that said serrations are presented radially outwardly of said head.

STANLEY JAFFA HARLEY.
JOHN ERNEST WAINWRIGHT.